(12) United States Patent
Zhang et al.

(10) Patent No.: US 10,416,364 B2
(45) Date of Patent: Sep. 17, 2019

(54) CURVED GRATING STRUCTURE, DISPLAY PANEL AND DISPLAY

(71) Applicant: BOE TECHNOLOGY GROUP CO., LTD., Beijing (CN)

(72) Inventors: Yuting Zhang, Beijing (CN); Ke Chao, Beijing (CN); Guobing Yin, Beijing (CN); Jiyang Shao, Beijing (CN); Min Peng, Beijing (CN); Xingdong Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 27 days.

(21) Appl. No.: 15/786,753

(22) Filed: Oct. 18, 2017

(65) Prior Publication Data

US 2018/0106934 A1    Apr. 19, 2018

(30) Foreign Application Priority Data

Oct. 19, 2016    (CN) .......................... 2016 1 0911912

(51) Int. Cl.
*G02B 5/18* (2006.01)
*G02B 27/22* (2018.01)
(Continued)

(52) U.S. Cl.
CPC ......... *G02B 5/1866* (2013.01); *G02B 5/1842* (2013.01); *G02B 27/2214* (2013.01);
(Continued)

(58) Field of Classification Search
CPC . G02B 5/1814; G02B 27/2214; G02B 6/0068
(Continued)

(56) References Cited

U.S. PATENT DOCUMENTS 6,262,844 B1 *    7/2001    Soskind ............... G02B 5/1814
                                                      359/565
6,943,788 B2 *    9/2005    Tomono ............. G02B 27/2214
                                                      345/419
(Continued)

FOREIGN PATENT DOCUMENTS

CN          1677136 A       10/2005
CN         102841394 A      12/2012
(Continued)

OTHER PUBLICATIONS

First Office Action for Chinese Application No. 201610911912.3, dated Apr. 24, 2017, 5 Pages.
(Continued)

*Primary Examiner* — Audrey Y Chang
(74) *Attorney, Agent, or Firm* — Brooks Kushman P.C.

(57) ABSTRACT

A curved grating structure, a display panel and the display device are provided. The curved grating structure includes multiple grating strips spaced from each other. Grating intervals between adjacent grating strips are successively decreased from a center point of the curved grating structure to a terminal of the curved grating structure. The grating interval between two adjacent grating strips is a distance in a first direction between center points of the two adjacent grating strips, and the first direction is a direction perpendicular to a normal vector of the curved grating structure passing through a center point of the curved grating structure.

11 Claims, 5 Drawing Sheets

(51) Int. Cl.
*G02F 1/1335* (2006.01)
*H01L 51/52* (2006.01)

(52) U.S. Cl.
CPC .... *G02F 1/133504* (2013.01); *G02F 2201/30* (2013.01); *H01L 51/5262* (2013.01)

(58) Field of Classification Search
USPC ........................................ 359/574, 565, 569
See application file for complete search history.

(56) References Cited

U.S. PATENT DOCUMENTS

| | | |
|---|---|---|
| 9,759,856 B2 * | 9/2017 | Jung .................... G02B 6/0068 |
| 2005/0219702 A1 | 10/2005 | Nakai |
| 2014/0043687 A1 | 2/2014 | Murata et al. |
| 2016/0349523 A1 | 12/2016 | Wei |

FOREIGN PATENT DOCUMENTS

| | | |
|---|---|---|
| CN | 104570368 A | 4/2015 |
| EP | 0718642 A1 | 6/1996 |
| JP | 2011059297 A | 3/2011 |
| JP | 2015121639 A | 7/2015 |

OTHER PUBLICATIONS

Chinese Search Report and Written Opinion for Application No. 201610911912.3, dated Feb. 16, 2017, 6 Pages.

\* cited by examiner

CURVED GRATING STRUCTURE, DISPLAY PANEL AND DISPLAY

CROSS-REFERENCE TO RELATED APPLICATION

This application claims priority to Chinese Patent Application No. 201610911912.3 filed on Oct. 19, 2016, which is incorporated herein by reference in its entirety.

TECHNICAL FIELD

The present disclosure relates to the field of display technology, in particular, to a curved grating structure, a display panel and a display device.

BACKGROUND

At present, a lens grating method is often applied to naked eye 3D displays, a basic principle of the lens grating method is described as follows. A displaying picture is divided into images from different angles suitable for being viewed by left and right eyes, a number of alternating left view areas and right view areas are presented to a viewer as a function of a lens grating, such that images seen from the left eye of the viewer are different from images seen from the right eye of the viewer, and the overall picture seen from the cooperated left and right eyes exhibits 3D effects.

In order to reduce the crosstalk between various viewpoints, the naked eye 3D display technology generally uses a curved grating structure. Those skilled in the art pay great attention on how to expand an optimum viewing area of the curved grating structure.

SUMMARY

Embodiments of the present disclosure provide a curved grating structure, a display panel and a display device, which can expand an optimum viewing area such that a wider viewing space is exhibited in a longitudinal direction.

In one respect, some embodiments of the present disclosure provide a curved grating structure, which includes multiple grating strips spaced from each other; where grating intervals between adjacent grating strips are successively decreased from a center point of the curved grating structure to a terminal of the curved grating structure, the grating interval between two adjacent grating strips is a distance in a first direction between center points of the two adjacent grating strips, the first direction is a direction perpendicular to a normal vector of the curved grating structure passing through a center point of the curved grating structure.

In an implementation, in the curved grating structure according to some embodiments of the present disclosure, the grating intervals between adjacent grating strips are successively decreased from the center point of the curved grating structure to the terminal of the curved grating structure in a nonlinear manner.

In another implementation, in the curved grating structure according to some embodiments of the present disclosure each grating interval between adjacent grating strips is determined by the following formula:

$$W_n = \frac{a_n^2}{a_1^2 + a_2^2 + \ldots + a_N^2} \cdot \frac{\theta}{2} \cdot R$$

where $W_n$ is the grating interval, $n=1, 2, 3 \ldots N$; $2N-1$ is a total number of the grating intervals, $$\frac{a_n^2}{a_1^2 + a_2^2 + \ldots + a_N^2}$$

is a nonlinear coefficient, $$a_n = a_1 + \frac{1 - a_1}{N - 1} \cdot (n - 1),$$

$a_1$ is a set parameter, R is a curvature radius of the curved grating structure, $\theta$ is an angle formed by a segment from a curvature circle-center of the curved grating structure to a center point of one grating strip of two adjacent grating strips corresponding to the grating interval and a segment from the curvature circle-center of the curved grating structure to a center point of the other grating strip of the two adjacent grating strips.

In an implementation, in the curved grating structure according to some embodiments of the present disclosure, with respect to the normal vector of the curved grating structure passing through the center point of the curved grating structure, grating intervals on one side of the normal vector and grating intervals on the other side of the normal vector are axial symmetrical, and each grating interval on one side is identical to a corresponding grating interval on the other side that is axial symmetrical with the each grating interval about the normal vector.

In an implementation, in the curved grating structure according to some embodiments of the present disclosure, for each grating interval, a ratio of a distance between two opposite ends of the two adjacent grating strips in the first direction and the grating interval is a preset value.

In an implementation, in the curved grating structure according to some embodiments of the present disclosure, the preset value ranges from 0.1 to 0.9.

In another aspect, some embodiments of the present disclosure further provide a display panel, which includes a curved substrate and any of the above-mentioned curved grating structures corresponding to the curved substrate.

In an implementation, in the display panel according to some embodiments of the present disclosure, where a curvature of the curved substrate is equal to a curvature of the curved grating structure.

In an implementation, the display panel according to some embodiments of the present disclosure may be a liquid crystal display panel or an electroluminescent display panel.

In another aspect, some embodiments of the present disclosure further provide a display device, which includes the above-mentioned display panel.

In the curved grating structure, the display panel and the display device according to the embodiments of the present disclosure, multiple grating strips are spaced from each other, and the grating intervals between adjacent grating strips are successively decreased from the center point of the curved grating structure to the terminal of the curved grating structure. By setting the grating intervals of the curved grating structure according to the above-mentioned embodiments of the present disclosure, an optimum viewing area is expanded, there is a wider viewing space in the longitudinal direction such that a better viewing experience can be achieved when an observer moves back and forth relative to the curved grating structure.

DETAILED DESCRIPTION

Specific implementations of a curved grating structure, a display panel and a display device are detailed hereinafter based on embodiments in conjunction with drawings of the present disclosure.

Shapes and sizes of respective elements in the drawings are merely illustrative for the present disclosure and do not reflect the true proportions of the curved grating structure.

Figure 1:
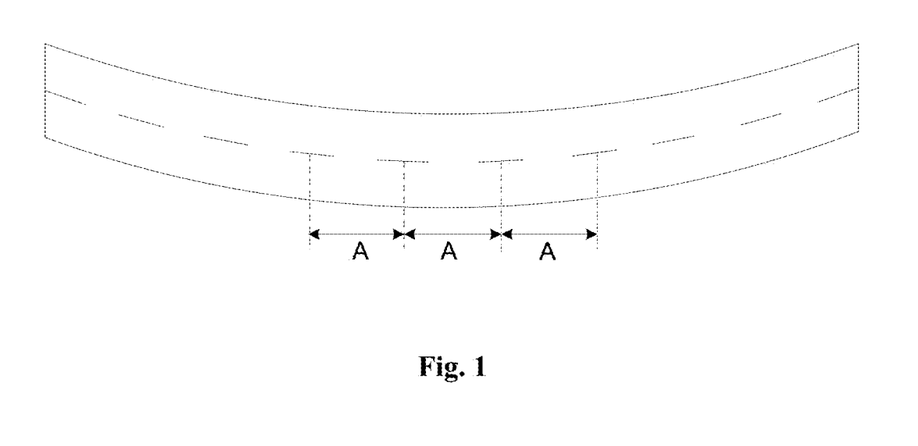
FIG. 1 is a schematic structural diagram of a curved grating structure in related technology.
Figure 2:
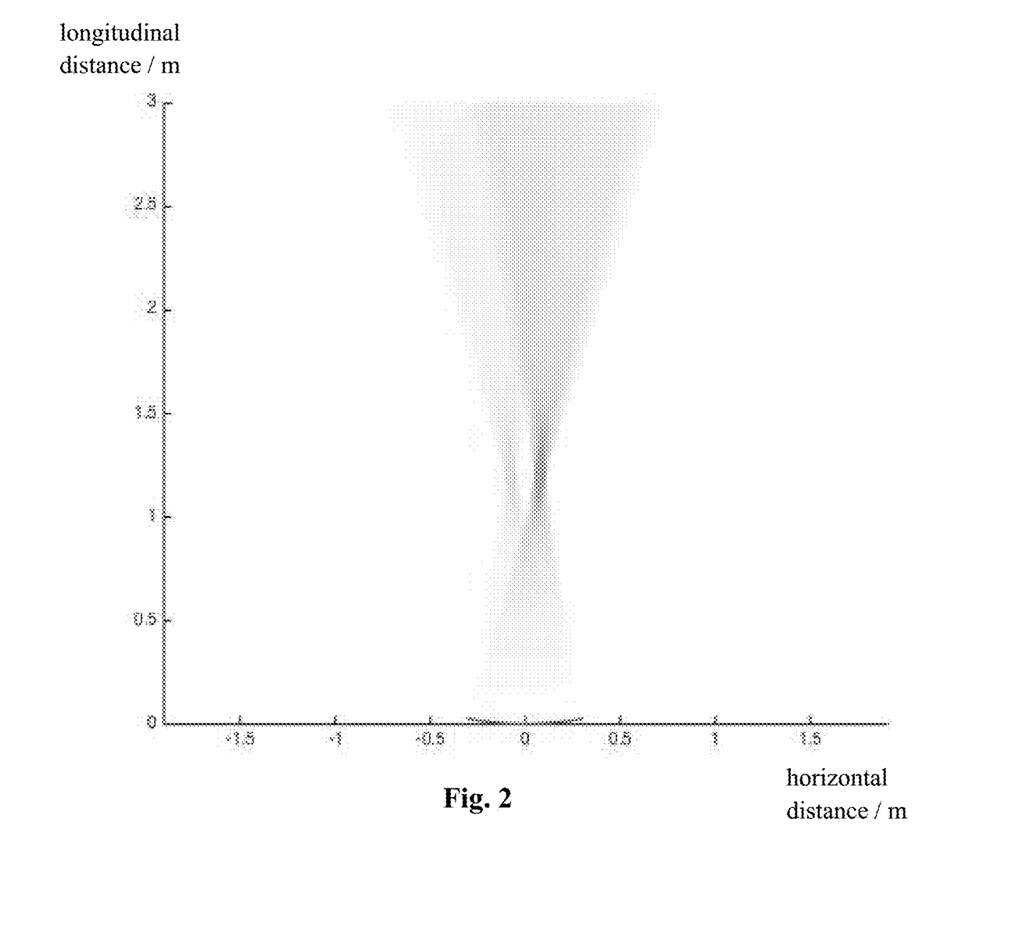
FIG. 2 is a schematic diagram of a viewing area of a curved grating structure in the related technology.
Figure 3:
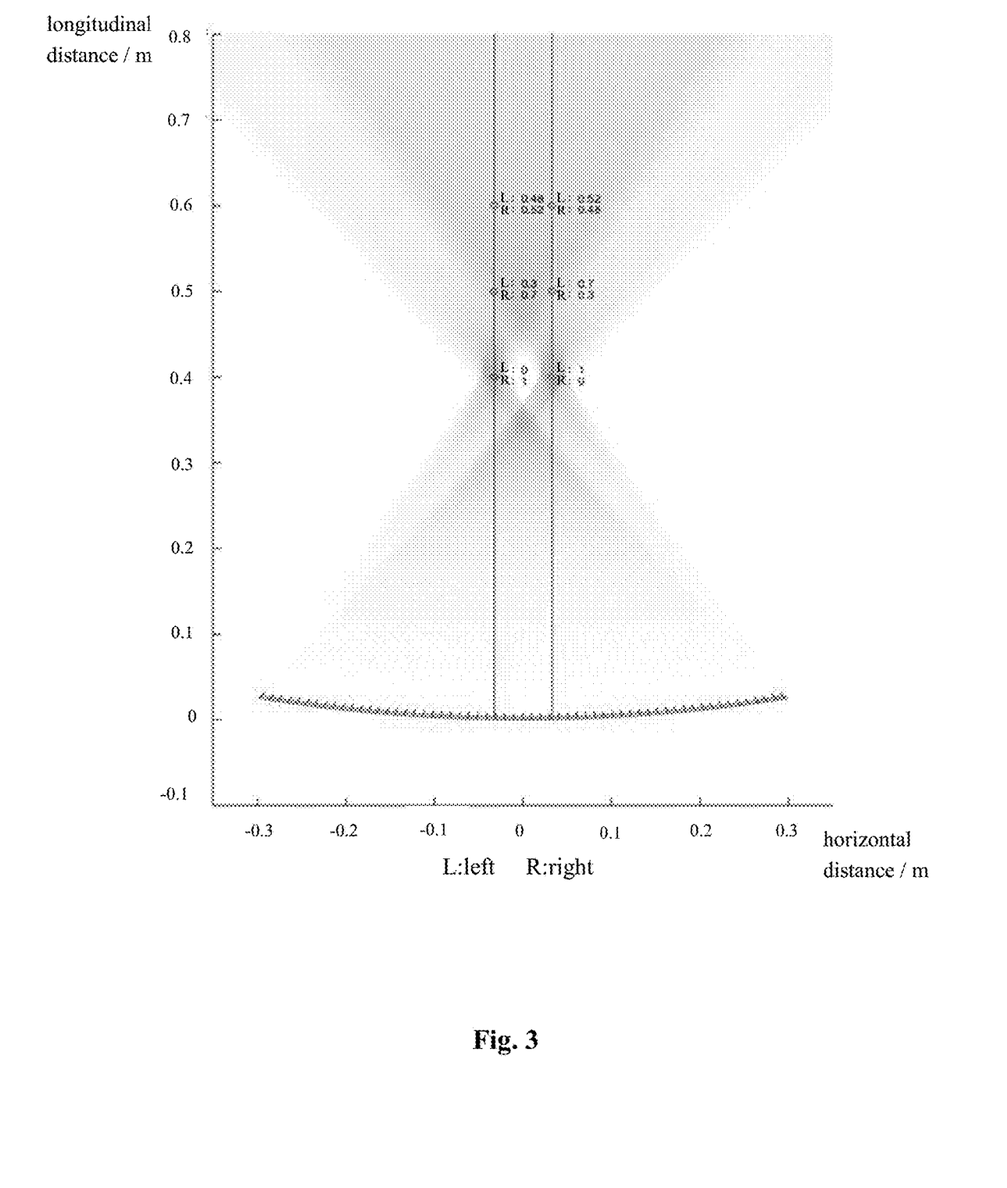
FIG. 3 is a schematic diagram of the optimum viewing area concentrated at two points in the FIG. 2.

As shown in FIG. 1, a curved grating structure in related technology includes multiple grating strips spaced from each other, a distance in a first direction between center points of any two adjacent grating strips is identical to A, the first direction is a direction perpendicular to a normal vector of the curved grating structure passing through a center point of the curved grating structure. As shown in FIG. 2, for the curved grating structure, an optimum viewing area is distributed periodically in space, an optimum 3D viewing experience can be obtained only when both eyes of the viewer are in the optimum viewing area, here, the optimum viewing area formed by the curved grating structure is roughly two polygons. FIG. 3 shows a normalization result of positions of human eyes, the optimum viewing experience cannot be obtained in the case that the viewer moves back and forth relative to the curved grating structure, i.e., the viewer moves longitudinally away from the optimum viewing area.

Figure 4:
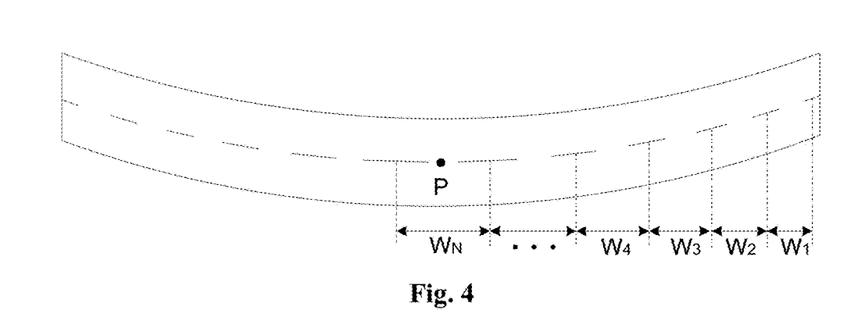
FIG. 4 is a schematic structural diagram of a curved grating structure according to some embodiments of the present disclosure.

Some embodiments of the present disclosure provide a curved grating structure, as shown in FIG. 4, which includes multiple grating strips that are spaced from each other, grating intervals between adjacent grating strips are successively decreased from a center point of the curved grating structure to a terminal of the curved grating structure, where the grating interval between two adjacent grating strips is a distance in a first direction between center points of the two adjacent grating strips, the first direction is a direction perpendicular to a normal vector of the curved grating structure passing through a center point of the curved grating structure.

Specifically, as shown in FIG. 4, grating intervals between adjacent grating strips from the center point P of the curved grating structure to a terminal (for example, a right terminal as shown in FIG. 4) of the curved grating structure are $W_N$, ..., $W_4$, $W_3$, $W_2$, and $W_1$ respectively, where N is a positive integer; that is, the grating interval between two adjacent grating strips located at the center point of the curved grating structure is $W_N$, and the grating interval between two adjacent grating strips located at the terminal of the curved grating structure is $W_1$. Grating intervals between adjacent grating strips are decreased successively from the center point of the curved grating structure to the terminal of the curved grating structure, i.e., $W_N > \ldots > W_4 > W_3 > W_2 > W_1$, and the grating interval between two adjacent grating strips located at the center point of the curved grating structure is largest among all the grating intervals.

Figure 5:
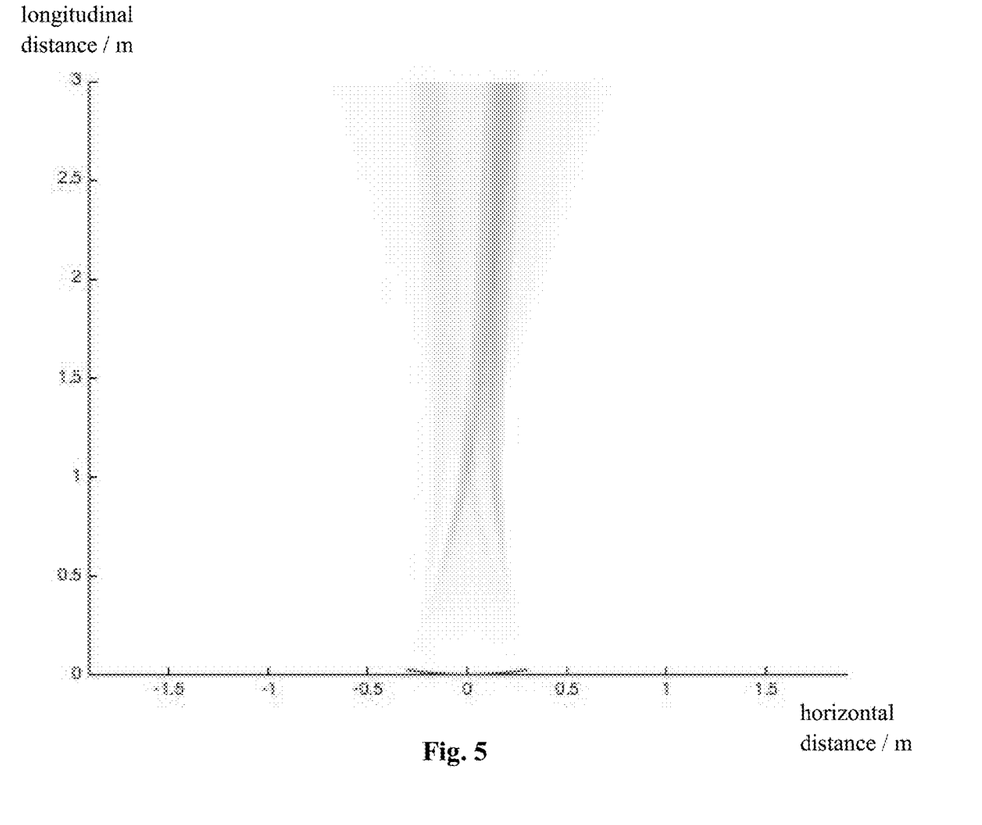
FIG. 5 is a schematic diagram of a viewing area of a curved grating structure according to some embodiments of the present disclosure.

In the curved grating structure according to the embodiments of the present disclosure, multiple grating strips are spaced from each other, and the grating intervals between adjacent grating strips are successively decreased from the center point of the curved grating structure to the terminal of the curved grating structure. By setting the grating intervals of the curved grating structure according to the above-mentioned embodiments of the present disclosure, an optimum viewing area as shown in FIG. 5 is expanded effectively compared to that in FIG. 2, and in particular, there is a wider viewing space in the longitudinal direction such that a better viewing experience can be achieved when an observer moves back and forth relative to the curved grating structure.

Figure 6:
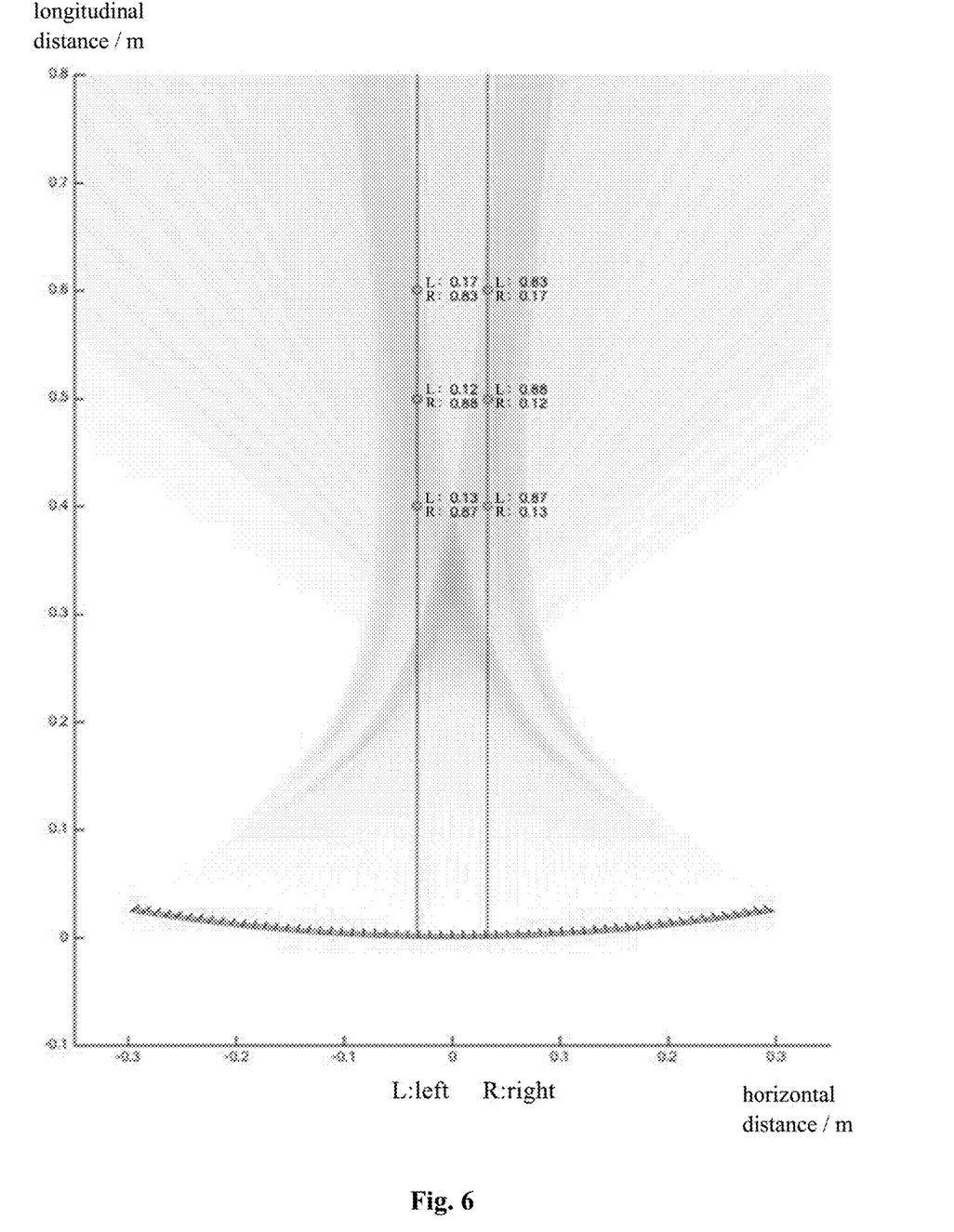
FIG. 6 is a schematic diagram of an optimum viewing area in a longitudinal direction of FIG. 5.

Specifically, FIG. 6 shows a normalizing result of positions of human eyes, which is obtained by using the curved grating structure provided in the foregoing embodiments of the present disclosure. Comparing FIG. 6 with FIG. 3, when a longitudinal distance is about 0.4 m, normalized distances of left and right movements of the human eyes in FIG. 6 are 0.13 at left and 0.87 at right, and 0.87 at left and 0.13 at right, whereas normalized distances of left and right movements of human eyes in FIG. 3 are 0 at left and 1 at right, and 1 at left and 0 at right; when the longitudinal distance is about 0.5 m, normalized distances of left and right movements of human eyes in FIG. 6 are 0.12 at left and 0.88 at right, and 0.88 at left and 0.12 at right, whereas normalized distances of left and right movements of human eyes in FIG. 3 are 0.3 at left and 0.7 at right, and 0.7 at left and 0.3 at right; when the longitudinal distance is about 0.6 m, normalized distances of left and right movements of human eyes in FIG. 6 are 0.17 at left and 0.83 at right, and 0.83 at left and 0.17 at right, whereas normalized distances of left and right movements of the human eyes in FIG. 3 are 0.48 at left and 0.52 at right, and 0.52 at left and 0.48 at right. From these data, it can be seen that, compared with a middle position having the optimum viewing, i.e., 0.5 at left and 0.5 right, the curved grating structure provided in the embodiments of the present disclosure is more resistant to interference, in the longitudinal direction, that is, at any longitudinal distance, images viewed by left and right eyes may not be interfered by left and right movements within a certain range; however, the curved grating structure in FIG. 1 may be subject to certain interference, especially when the longitudinal distance is about 0.6 m, the middle position for viewing is 0.5 at left and 0.5 at right, which is very close to normalized distances of left and right movements of the human eyes, i.e., 0.48 at left and 0.52 at right and 0.52 at left and 0.48 at right, in this case, the human eyes almost can barely move left or right otherwise the images viewed by the left and right eyes may be interfered.

During implementing the curved grating structure provided in some embodiments of the present disclosure, in order to further reduce the crosstalk, as shown in FIG. 4, grating intervals between adjacent grating strips are nonlinearly decreased successively from the center point of the curved grating structure to the terminal of the curved grating structure, in particular, $W_N, \ldots, W_4, W_3, W_2,$ and $W_1$ are nonlinearly decreased successively, which can ensure that the longitudinal range of the optimum viewing area is increased and a wider viewing space is exhibited in the longitudinal direction.

Further, during implementing the curved grating structure provided in some embodiments of the present disclosure, the gate intervals $W_n$ between adjacent grating strips are obtained by the following formula:

$$W_n = \frac{a_n^2}{a_1^2 + a_2^2 + \ldots + a_N^2} \cdot \frac{\theta}{2} \cdot R$$

where n=1, 2, 3 ... N, N is a positive integer, and 2N−1 is the total number of the grating intervals, $$\frac{a_n^2}{a_1^2 + a_2^2 + \ldots + a_N^2}$$

is a nonlinear coefficient, $$a_n = a_1 + \frac{1 - a_1}{N - 1} \cdot (n - 1),$$

$a_1$ is a set parameter, R is a curvature radius of the curved grating structure, θ is an angle formed by a segment from a curvature circle-center of the curved grating structure to a center point of one grating strip of two adjacent grating strips corresponding to the grating interval and a segment from the curvature circle-center of the curved grating structure to a center point of the other grating strip of the two adjacent grating strips.

Figure 7:
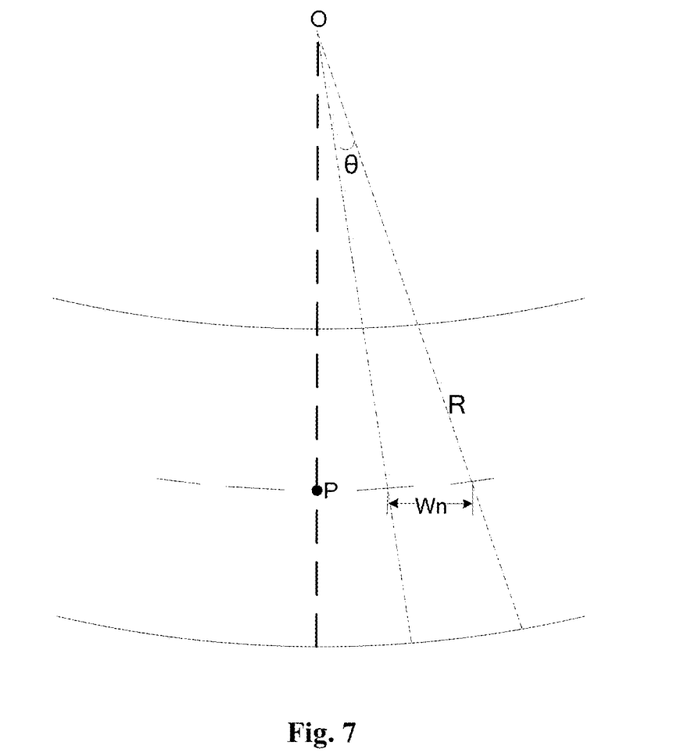
FIG. 7 is a schematic diagram illustrating a relationship among a grating interval between center points of two adjacent grating strips, an angle formed by a segment from a curvature circle-center of the curved grating structure to the center point of one grating strip of the two adjacent grating strips and a segment from the curvature circle-center of the curved grating structure to the center point of the other grating strip of the two adjacent grating strips, and a curvature radius according to some embodiments of the present disclosure.

Specifically, as shown in FIG. 7, R is a curvature radius of the curved grating structure, θ is an angle formed by a segment from a curvature circle-center O of the curved grating structure to a center point of one grating strip of two adjacent grating strips corresponding to the grating interval $W_n$ and a segment from the curvature circle-center O of the curved grating structure to a center point of the other grating strip of the two adjacent grating strips, and P is a center point of the curved grating structure.

It should be noted that, $a_1$ is a set parameter, which may be selected as $a_1$=0.9, and then, $a_2$=0.9+0.1/(N−1), $a_3$=0.9+[0.1/(N−1)]×2, $a_4$=0.9+[0.1/(N−1)]×3, . . . , $a_N$=1.

In order to construct the nonlinear coefficient in the above formula, the following formula should be satisfied:

$$W_1:W_2:W_3: \ldots : W_N = a_1^2:a_2^2: a_3^2: \ldots : a_N^2$$

Figure 8:
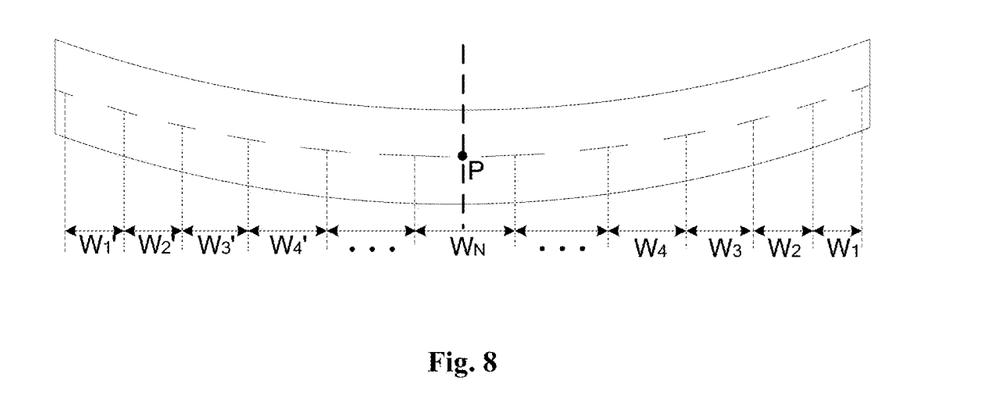
FIG. 8 is a schematic structural diagram of a curved grating structure according to some embodiments of the present disclosure.

During a specific implementation, in a curved grating structure provided in some embodiments of the present disclosure, the curved grating structure may be designed into a symmetrical pattern such that the optimum viewing area is located in a middle region and thus it is convenient for the viewer to view. In particular, with respect to a normal vector of the curved grating structure passing through the center point of the curved grating structure, grating intervals on the left of the normal vector and grating intervals on the right of the normal vector are axial symmetrical, and each grating interval on the left may be identical to a corresponding grating interval on the right that is axial symmetrical with the grating interval on the left about the normal vector. As shown in FIG. 8, with respect to a normal vector of the curved grating structure passing through the center point P of the curved grating structure, grating intervals on the left of the normal vector and grating intervals on the right of the normal vector are axial symmetrical; i.e., grating intervals from the center point P of the curved gating structure to the right terminal of the curved gating structure are respectively $W_N, W_{N-1} \ldots W_4, W_3, W_2, W_1$, grating intervals from the center point P of the curved gating structure to the left terminal of the curved gating structure are respectively $W_N, W_{N-1}' \ldots, W_4', W_3', W_2', W_1'$, here N is a positive integer, $W_{N-1}=W_{N-1}', W_4=W_4', W_3=W_3', W_2=W_2', W_1=W_1'$.

During a specific implementation, in the above-mentioned curved grating structure provided in the embodiments of the present disclosure, on basis that grating intervals from the center point of the curved grating structure to each terminal of the curved grating structure are decreased successively, for each grating interval, a ratio of a distance between two opposite ends of the two adjacent grating strips in the first direction and the grating interval is a preset value.

Further, in an implementation, in a curved grating structure according to some embodiments of the present disclosure, the pre-set value may be set within a range from 0.1 to 0.9.

Based on the same concept, some embodiments of the present disclosure further provide a display panel, which includes a curved substrate, and a curved grating structure corresponding to the curved substrate, the curved grating structure here is provided in any one of the foregoing embodiments of the present disclosure.

During a specific implementation, in a display panel according to some embodiments of the present disclosure, a curvature of the curved substrate is equal to a curvature of the curved grating structure.

During a specific implementation, a display panel according to some embodiments of the present disclosure may be a liquid crystal display panel or an electroluminescent display panel. Moreover, the display panel may be a display panel of other kinds, which is not limited herein.

Based on the same concept, some embodiments of the present disclosure further provide a display device, which includes the display panel provided in the foregoing embodiments of the present disclosure. The display device may be products or components with a display function, such as a mobile phone, a tablet computer, a television set, a display, a notebook computer, a digital photo frame, a navigator and the like. Other essential components of the display device can be conceived by those skilled in the art, which will be not repeated herein and should not be construed as limiting the present disclosure. The implementation of the display device will not be repeated, which can be achieved in reference to the embodiments of the display panel or the curved grating structure described above.

In the curved grating structure, the display panel and the display device according to the embodiments of the present disclosure, multiple grating strips are spaced from each other, and the grating intervals between adjacent grating strips are successively decreased from the center point of the curved grating structure to the terminal of the curved grating structure. By setting the grating intervals of the curved grating structure according to the above-mentioned embodiments of the present disclosure, an optimum viewing area is expanded, there is a wider viewing space in the longitudinal direction such that a better viewing experience can be achieved when an observer moves back and forth relative to the curved grating structure.

It is obvious to those skilled in the art that various modifications and variations to the present disclosure can be made without departing from the spirit and scope of the present disclosure. Thus, provided that such modifications and variations of the present disclosure fall within the scope of the appended claims of the present disclosure and equivalent technology, the present disclosure also intends to contain those modifications and variations.

What is claimed is:

1. A curved grating structure, comprising a plurality of grating strips spaced from each other;
    wherein grating intervals between adjacent grating strips are successively decreased from a center point of the curved grating structure to a terminal of the curved grating structure, the grating interval between two adjacent grating strips is a distance in a first direction between center points of the two adjacent grating strips, the first direction is a direction perpendicular to a normal vector of the curved grating structure passing through a center point of the curved grating structure;
    wherein the grating intervals between adjacent grating strips are successively decreased from the center point of the curved grating structure to the terminal of the curved grating structure in a nonlinear manner; and
    wherein each grating interval between adjacent grating strips is determined by the following formula:

$$W_n = \frac{a_n^2}{a_1^2 + a_2^2 + \ldots + a_N^2} \cdot \frac{\theta}{2} \cdot R$$

where $W_n$ is the grating interval, n=1, 2, 3 ... N; 2N−1 is a total number of the grating intervals, $$\frac{a_n^2}{a_1^2 + a_2^2 + \ldots + a_N^2}$$

is a nonlinear coefficient, $$a_n = a_1 + \frac{1 - a_1}{N - 1} \cdot (n - 1),$$

$a_1$ is a set parameter, R is a curvature radius of the curved grating structure, θ is an angle formed by a segment from a curvature circle-center of the curved grating structure to a center point of one grating strip of two adjacent grating strips corresponding to the grating interval and a segment from the curvature circle-center of the curved grating structure to a center point of the other grating strip of the two adjacent grating strips.

2. The curved grating structure according to claim 1, wherein with respect to the normal vector of the curved grating structure passing through the center point of the curved grating structure, grating intervals on one side of the normal vector and grating intervals on the other side of the normal vector are axial symmetrical, and each grating interval on one side is identical to a corresponding grating interval on the other side that is axial symmetrical with the each grating interval about the normal vector.

3. The curved grating structure according to claim 1, wherein for each grating interval, a ratio of a distance between two opposite ends of the two adjacent grating strips in the first direction and the grating interval is a preset value.

4. The curved grating structure according to the claim 3, wherein the preset value ranges from 0.1 to 0.9.

5. A display panel, comprising a curved substrate and a curved grating structure corresponding to the curved substrate;
    wherein the curved grating structure comprises a plurality of grating strips spaced from each other;
    wherein grating intervals between adjacent grating strips are successively decreased from a center point of the curved grating structure to a terminal of the curved grating structure, the grating interval between two adjacent grating strips is a distance in a first direction between center points of the two adjacent grating strips, the first direction is a direction perpendicular to a normal vector of the curved grating structure passing through a center point of the curved grating structure;
    wherein the grating intervals between adjacent grating strips are successively decreased from the center point of the curved grating structure to the terminal of the curved grating structure in a nonlinear manner; and
    wherein each grating interval between adjacent grating strips is determined by the following formula:

$$W_n = \frac{a_n^2}{a_1^2 + a_2^2 + \ldots + a_N^2} \cdot \frac{\theta}{2} \cdot R$$

wherein $W_n$ is the grating interval, n=1, 2, 3 ... N, 2N−1 is a total number of the grating intervals, $$\frac{a_n^2}{a_1^2 + a_2^2 + \ldots + a_N^2}$$

is a nonlinear coefficient, $$a_n = a_1 + \frac{1 - a_1}{N - 1} \cdot (n - 1),$$

$a_1$ is a set parameter, R is a curvature radius of the curved grating structure, θ is an angle formed by a segment from a curvature circle-center of the curved grating structure to a center point of one grating strip of two adjacent grating strips corresponding to the grating interval and a segment from the curvature circle-center of the curved grating structure to a center point of the other grating strip of the two adjacent grating strips.

6. The display panel according to claim 5, wherein a curvature of the curved substrate is equal to a curvature of the curved grating structure.

7. The display panel according to claim 6, wherein the display panel is a liquid crystal display panel or an electroluminescent display panel.

8. The display panel according to claim 5, wherein with respect to the normal vector of the curved grating structure passing through the center point of the curved grating structure, grating intervals on one side of the normal vector and grating intervals on the other side of the normal vector are axial symmetrical, and each grating interval on one side is identical to a corresponding grating interval on the other side that is axial symmetrical with the each grating interval about the normal vector.

9. A display device, comprising a display panel, wherein the display panel comprises a curved substrate and a curved grating structure corresponding to the curved substrate;

wherein the curved grating structure comprises a plurality of grating strips spaced from each other;

wherein grating intervals between adjacent grating strips are successively decreased from a center point of the curved grating structure to a terminal of the curved grating structure, the grating interval between two adjacent grating strips is a distance in a first direction between center points of the two adjacent grating strips, the first direction is a direction perpendicular to a normal vector of the curved grating structure passing through a center point of the curved grating structure;

wherein the grating intervals between adjacent grating strips are successively decreased from the center point of the curved grating structure to the terminal of the curved grating structure in a nonlinear manner; and wherein each grating interval between adjacent grating strips is determined by the following formula:

$$W_n = \frac{a_n^2}{a_1^2 + a_2^2 + \ldots + a_N^2} \cdot \frac{\theta}{2} \cdot R$$

wherein $W_n$ is the grating interval, $n=1, 2, 3 \ldots N$; $2N-1$ is a total number of the grating intervals, $$\frac{a_n^2}{a_1^2 + a_2^2 + \ldots + a_N^2}$$

is a nonlinear coefficient, $$a_n = a_1 + \frac{1 - a_1}{N - 1} \cdot (n - 1),$$

$a_1$ is a set parameter, R is a curvature radius of the curved grating structure, $\theta$ is an angle formed by a segment from a curvature circle-center of the curved grating structure to a center point of one grating strip of two adjacent grating strips corresponding to the grating interval and a segment from the curvature circle-center of the curved grating structure to a center point of the other grating strip of the two adjacent grating strips.

10. The display device according to claim 9, wherein a curvature of the curved substrate is equal to a curvature of the curved grating structure.

11. The display device according to claim 9, wherein with respect to the normal vector of the curved grating structure passing through the center point of the curved grating structure, grating intervals on one side of the normal vector and grating intervals on the other side of the normal vector are axial symmetrical, and each grating interval on one side is identical to a corresponding grating interval on the other side that is axial symmetrical with the each grating interval about the normal vector.

* * * * *